United States Patent [19]

Inazawa et al.

[11] Patent Number: 5,431,954
[45] Date of Patent: Jul. 11, 1995

[54] HEAT RESISTANT INSULATED WIRE AND METHOD OF PREPARING THE SAME

[75] Inventors: Shinji Inazawa; Kouichi Yamada, both of Osaka, Japan

[73] Assignee: Sumitomo Electric Industries, Ltd., Osaka, Japan

[21] Appl. No.: 293,052

[22] Filed: Aug. 19, 1994

Related U.S. Application Data

[62] Division of Ser. No. 195,611, Feb. 14, 1994, Pat. No. 5,368,935.

[30] Foreign Application Priority Data

Feb. 12, 1993 [JP] Japan .................. 5-23143

[51] Int. Cl.6 ............................. B05D 5/12
[52] U.S. Cl. ...................... 427/117; 427/118; 427/120; 427/126.3; 427/387
[58] Field of Search ............ 174/405; 427/47, 118, 427/120, 126.3, 387; 428/387, 390, 391; 525/474; 528/7, 38

[56] References Cited

U.S. PATENT DOCUMENTS 4,439,255  3/1984  Imai et al. .................. 156/49

FOREIGN PATENT DOCUMENTS

| | | |
|---|---|---|
| 0389084 | 9/1990 | European Pat. Off. . |
| 0481434 | 4/1992 | European Pat. Off. . |
| 0489428 | 6/1992 | European Pat. Off. . |
| 57-122248 | 3/1982 | Japan . |
| 61-7685 | 3/1986 | Japan . |
| 2222511 | 9/1990 | Japan . |
| 4320055 | 11/1992 | Japan . |

*Primary Examiner*—Michael Lusignan
*Attorney, Agent, or Firm*—W. G. Fasse; W. F. Fasse

[57] ABSTRACT

Disclosed herein are a heat resistant insulated wire which is not decomposed but maintains insulativity under a high temperature with excellent adhesion of a coating film, and a method of preparing the same. The heat resistant insulated wire includes a base material consisting of an electrical conductor, and an insulating layer provided on its surface. The insulating layer is obtained by heating a second polymer, in which main chains expressed in a chemical formula $-[Si(R_1)_2-N(R_2)]_n-$ are cross-linked with each other by chloroborazine through side chains containing trialkylsilyl radicals at a temperature of at least about 300° C. and not more than 500° C.

11 Claims, 1 Drawing Sheet

HEAT RESISTANT INSULATED WIRE AND METHOD OF PREPARING THE SAME

CROSS-REFERENCE TO RELATED APPLICATION(S)

This is a DIVISIONAL of U.S. patent application Ser. No. 08/195,611, filed Feb. 14, 1994, now U.S. Pat. No. 5,368,935, patented Nov. 29, 1994.

BACKGROUND OF THE INVENTION

1. Field of the Invention

The present invention relates to a heat resistant insulated wire and a method of preparing the same, and more particularly, it relates to a heat resistant insulated wire having excellent heat resistance which is applied to a solenoid, a transformer or a motor used in a high vacuum or under a high temperature, and a method of preparing the same.

2. Description of the Background Art

A heat resistant insulated wire may be applied to equipment such as heating equipment or a fire alarm, which must have safety under a high temperature. The heat resistant insulated wire is also employed in the environment of an automobile, the engine on which is heated to a high temperature. Such a heat resistant insulated wire generally comprises a conductor which is coated with heat resistant organic resin such as polyimide, polyamideimide, PEEK, fluororesin, PPS, aramid or polymaleimide, for example.

Japanese Patent Publication No. 61-7685 (1986) discloses a heat resistant insulated wire which is prepared by coating a conductor with an unmolten inorganic substance and an organic binder. After the organic resin is heated and thermally decomposed, ceramics still remains in this wire to maintain its insulativity.

However, the heat resistant organic resin which is employed for coating such a conventional heat resistant insulated wire cannot sufficiently withstand a high temperature.

For example, even the polyimide Upylex (product of Ube Industries, Ltd.) which is regarded as withstanding the highest temperature among heat resistant organic resin products can merely withstand 270° C. at the most, and most of heat resistant organic resin products cannot be used under temperatures exceeding 250° C.

In a heat resistant insulated wire comprising a conductor which is coated with an unmolten inorganic substance and an organic binder as disclosed in Japanese Patent Publication No. 57-12248 (1982), the organic binder is thermally decomposed and inorganic powder remains when the wire is used under a temperature exceeding the withstand temperature of the organic binder. After such decomposition, the coating film is in a porous state and its adhesion is reduced as compared with that in the initial stage, while fallout of the coating film is observed. When the organic binder is decomposed, further, a gas which is mainly composed of hydrocarbon may be generated to catch fire.

SUMMARY OF THE INVENTION

In order to solve the aforementioned problems, an object of the present invention is to provide a heat resistant insulated wire which is not decomposed but maintains insulativity under a high temperature with excellent adhesion of a coating film, and a method of preparing the same.

According to an aspect of the present invention, a method of preparing a heat resistant insulated wire is provided. This method comprises a step of adding not more than 1 part by weight of chloroborazine to 10 parts by weight of a first polymer containing main chains which are expressed in the following chemical formula:

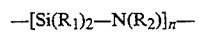

where n > zero and $R_1$ and $R_2$ independently represent hydrogen or hydrocarbon radicals, and side chains which are expressed in the following chemical formula:

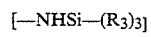

where $R_3$ represents a hydrocarbon radical, for forming a second polymer in which the main chains of the first polymer are cross-linked by the choroborazine through the side chains, a step of applying a coating solution containing the second polymer onto a surface of a base material consisting of an electrical conductor, and a step of heat treating the base material which is coated with the coating solution at a temperature of at least about 300° C. and not more than 500° C.

Preferably, $R_1$ represents a radical which is selected from a group of hydrogen, straight and branched chain saturated and unsaturated aliphatic hydrocarbons, and aromatic hydrocarbon.

More preferably, $R_1$ represents a radical which is selected from a group of hydrogen, methyl, ethyl, propyl, butyl and phenyl radicals.

Preferably, $R_2$ represents a radical which is selected from a group of hydrogen, straight and branched chain saturated and unsaturated aliphatic hydrocarbons and aromatic hydrocarbon.

More preferably, $R_2$ represents a radical which is selected from a group of hydrogen, methyl, ethyl, propyl, butyl and phenyl radicals.

Preferably, $R_3$ represents a methyl or phenyl radical. n can be 1,000 to 10,000, preferably 2,000 to 3,000, for example.

The first polymer has a molecular weight of about 300 to 200,000, and more preferably the same can have an average molecular weight of about 8,000 to 9,000.

The second polymer is preferably cross-linked by about 1 part by weight of chloroborazine with respect to 10 parts by weight of the first polymer.

The base material preferably includes a chromium oxide layer on a surface of the conductor.

The conductor may be made of copper, copper alloy, aluminum, aluminum alloy, nickel, nickel alloy, nickel plated copper or SUS, for example.

According to another aspect of the present invention, a heat resistant insulated wire is provided.

This heat resistant insulated wire includes a base material which consists of an electrical conductor and an insulated layer which is formed on a surface of the base material, and the insulating layer contains a third polymer which is obtained by heating a second polymer expressed in the following formula at a temperature of at least about 300° C. and not more than 500° C.:

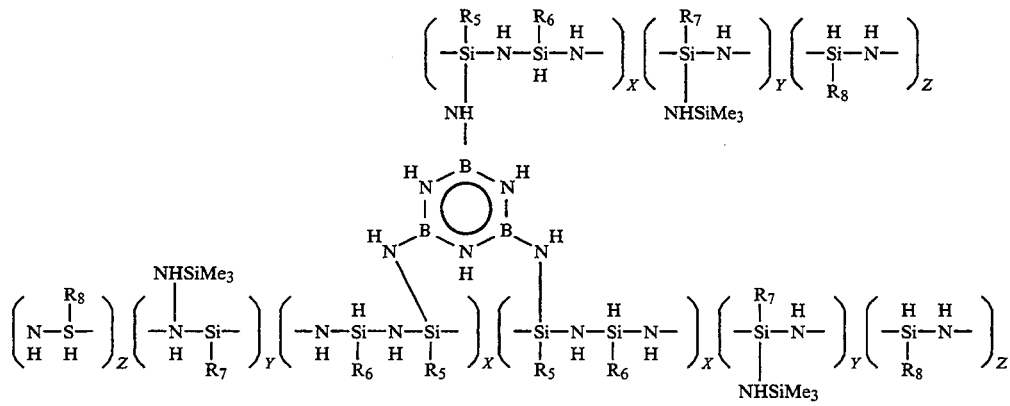

where $X>0$, $Y\geq 0$ and $Z\geq 0$, and $R_5$, $R_6$, $R_7$ and $R_8$ represent radicals selected from a group of hydrogen, methyl and phenyl radicals, while $R_5$, $R_6$, $R_7$ and $R_8$ represent hydrogen radicals when $R_4$ represents a hydrogen radical.

Preferably, $R_6$ and $R_8$ represent phenyl radicals, and $R_5$ and $R_7$ represent hydrogen radicals.

Alternatively, $R_6$ and $R_8$ preferably represent methyl radicals, and $R_5$ and $R_7$ preferably represent hydrogen or methyl radicals.

X can be 1 to 10, for example.

Y can be 0 to 10, for example.

Z can be 0 to 1, for example.

The base material preferably includes a chromium oxide layer on a surface of the conductor.

The conductor can be made of copper, copper alloy, aluminum, aluminum alloy, nickel, nickel alloy, nickel plated copper or SUS, for example.

In the first polymer which is employed in the present invention, the main chains which are expressed in the chemical formula $-[Si(R_1)_2-N(R_2)]_n-$ exhibit thermoplasticity and are softened at a temperature of at least 100° C. and not more than 300° C. when $R_1$ represents any one of hydrogen, methyl, ethyl, propyl, butyl and phenyl radicals and $R_2$ represents any one of hydrogen, methyl, ethyl, propyl, butyl and phenyl radicals, for example. Further, these organic radicals are thermally decomposed in a temperature range of 300° C. to 500° C. if $R_1$ and $R_2$ include no phenyl radicals. If $R_1$ represents a phenyl radical, on the other hand, elimination of the phenyl radical is caused by thermal decomposition at a temperature of about 650° C.

The side chains bonded with the main chains contain trialkylsilyl radicals which are expressed in a chemical formula $[-NHSi-(R_3)_3]$. These trialkylsilyl radicals cause cross linking reaction with trichloroborazine having the following structure (1) along the following reaction formula (2):

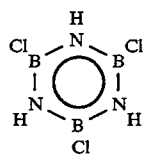

(1)

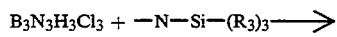 (2)

Namely, one molecule of the trialkylsilyl radicals is replaced by one chlorine atom of the trichloroborazine, to form a cross-linked structure.

The inventors have confirmed through an experiment that, when this trichloroborazine is added to 10 parts by weight of a polymer in an amount exceeding 1 part by weight, the as-obtained polymer is in a strong solid state and improper for coating.

In a polymer which is cross-linked with trichloroborazine, organic radicals other than a phenyl radical are thermally decomposed and eliminated by heat treatment at a temperature of up to about 500° C., while $-(Si-N)_n-$ forming the skeletons of main chains and borazine $B_3N_3$ cross-linking the skeletons remain to provide a compound which is stable up to a high temperature. Further, such an SiN polymer which is cross-linked by borazine exhibits excellent flexibility. Thus, this polymer is preferably heated at a temperature of about 300° C. to 500° C.

According to the present invention, a chromium oxide layer may be formed on the surface of the conductor by electroplating, in order to reinforce adhesion of the coating film. The chromium oxide layer has excellent wettability with the inventive organic metal polymer or a solution thereof, whereby strong adhesion can be attained.

According to the present invention, as hereinabove described, it is possible to obtain a heat resistant insulated wire which is not decomposed but maintains insulativity under a high temperature and provided with excellent adhesion of a coating film, and a method of preparing the same.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
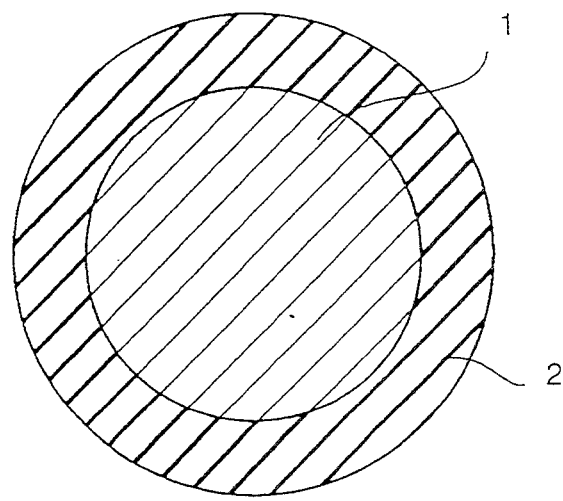
FIG. 1 is a sectional view showing the structure of a heat resistant insulated wire according to Example 1 of the present invention.

An exemplary method of preparing a heat resistant insulated wire according to the present invention is now described.

First, 1,1,1,3,3,3-hexamethylsilazane was reacted with a compound expressed as $R_4SiCl_3$, to form a first polymer having the following structural formula:

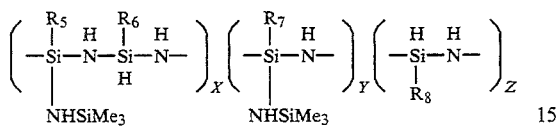

where $X>0$, $Y \geq 0$ and $Z \geq 0$, and $R_4$, $R_5$, $R_6$, $R_7$ and $R_8$ represent radicals selected from a group of hydrogen, methyl and phenyl radicals, while $R_5$, $R_6$, $R_7$ and $R_8$ represent hydrogen radicals when $R_4$ represents a hydrogen radical.

Then, not more than 1 part by weight of chloroborazine was added to 10 parts by weight of the first polymer, to form a second polymer having the following structure:

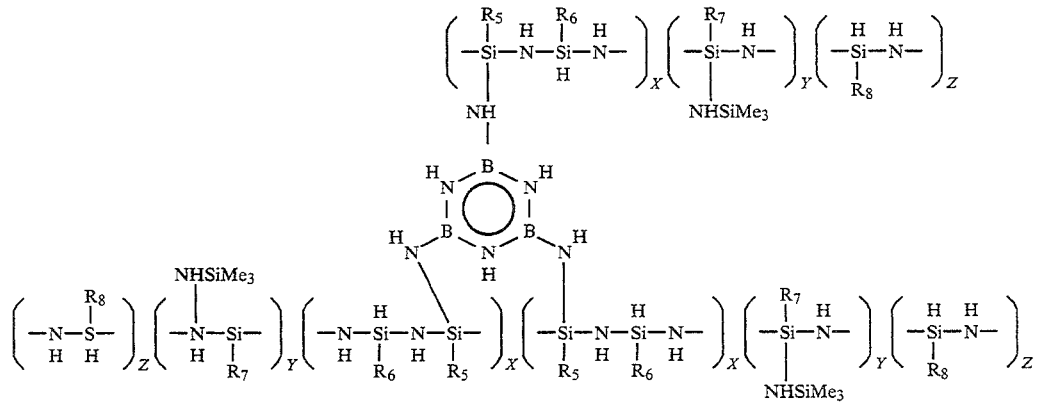

where X, Y, $R_5$, $R_6$, $R_7$ and $R_8$ are identical to the above.

Then, a coating solution containing the second polymer was applied onto a surface of a base material consisting of an electrical conductor, and thereafter the base material which was coated with the coating solution was heat treated at a temperature of at least about 300° C. and not more than 500° C.

Thus, an exemplary heat resistant insulated wire according to the present invention was obtained.

Concrete Examples of the present invention are now described.

(EXAMPLE 1)

First, 40 g of 1,1,1,3,3,3-hexamethyldisilazane (product of Wako Pure Chemical Industries, Ltd.) having the following structure (3) was mixed with 20 g of trichloromonophenylsilane having the following structure (4) under a nitrogen jet, and stirred at 70° C. for 1 hour. Then, distillation was carried out at 160° C., to distill away by-products. Then, vacuum distillation was carried out at 250° C. and 5 mmHg, whereby, it was possible to completely remove the by-products.

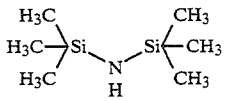

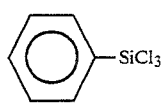

Thus, a polymer having the following structure (5) was obtained. This polymer had weight average molecular weight of about 8700.

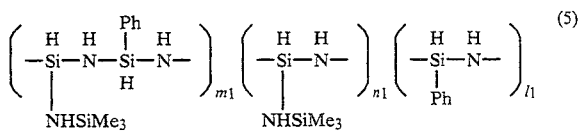

$m_1 > 0$, $l_1$, $n_1 \geq 0$ where $m_1 > 0$, and $l_1$, $n_1 \geq 0$.

Then, this polymer was dissolved in dichloromethane, to prepare a 50 wt. % solution. Then, 1 cc of a 2 wt. % solution of trichloroborazine (product of Alfa Chemical Corporation) which was dissolved in dichloromethane was mixed into this solution at a temperature of −80° C., and the temperature of this mixture was returned to the room temperature level over a period of 1 hour.

Thus, a coating solution having the following structure (6), in which main chains of the polymer expressed in the formula (5) were cross-linked with each other by chloroborazine through the side chains of— NHSiMe₃, was obtained:

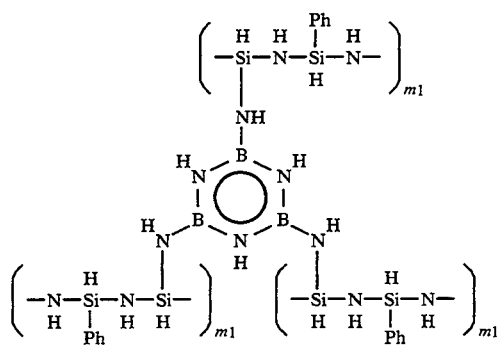

(6)

This polymer coating solution was applied onto a nickel-plated copper wire of 1 mm in outer diameter, by dipping the base material in the coating solution and lifting the same at a speed of 10 mm/min.

Then, the base material thus coated with the coating solution on its outer surface was heated under a nitrogen atmosphere at a temperature of about 450° C. for 10 minutes. The coating and heating steps were carried out three times, to form a coating film of 5 μm in thickness.

FIG. 1 is a sectional view showing the structure of the as-obtained heat resistant insulated wire.

Referring to FIG. 1, this wire comprises a nickel-coated copper wire 1 which is coated with a coating layer 2.

The dielectric breakdown voltage of the heat resistant insulated wire obtained in the aforementioned manner was measured for evaluating insulativity. As the result, the dielectric breakdown voltage was 1600 V under the room temperature. When a sample which was heated at 600° C. for 100 hours was cooled on standing to the room temperature, this sample exhibited a dielectric breakdown voltage of 1000 V. When this heat resistant insulated wire was wound on an outer peripheral surface of a cylinder having a diameter of 30 cm, no cracking was caused in the insulating layer.

(EXAMPLE 2)

A wire comprising a copper wire of 0.5 mm in wire diameter which was coated with 100 μm of SUS304 by pipe engagement was employed as a base material. First, a chromium oxide layer was formed on this base material in the following manner:

An electroplating solution was prepared from an electrolytic bath containing 200 g/l of chromic anhydride, 6.5 g/l of glacial acetic acid, 80 g/l of nickel chloride and 5 g/l of sodium nitrate. Plating conditions were a cathode of a conductor, a bath temperature of 40° C., a current density of 100 A/dm² and a treatment time of 2 minutes. Thus, a chromium oxide layer of about 1 μm in thickness was formed on the outer surface of the conductor. Then, 40 g of 1, 1, 1, 3, 3, 3 - hexamethyldisilazane (product of Wako Pure Chemical Industries, Ltd.) having the aforementioned structure (3) was mixed with 15 g of trichloromonomethylsilane having the following structure (7) under a nitrogen jet, and stirred at 70° C. for 1 hour. Then, distillation was carried out at 160° C., to distill away by-products. Then, vacuum distillation was carried out at 180° C. and 5 mmHg, whereby it was possible to completely remove the by-products.

$$\begin{matrix} & Cl \\ & | \\ Me-&Si-Cl \\ & | \\ & Cl \end{matrix}$$ (7)

Thus, a mixture of polymers having the following structures (8) and (9) was obtained. This mixture had a weight average molecular weight (Mw) of about 9200.

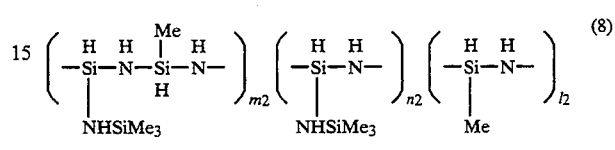

$m_2 > 0$, $n_2$, $l_2 \geq 0$ where $m_2 > 0$, and $n_2$ and $l_2 > 0$.

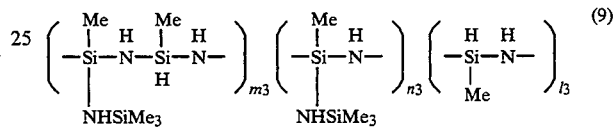

$m_3 > 0$, $n_3$, $l_3 \geq 0$ where $m_3 > 0$, and $n_3$ and $l_3 \geq 0$.

This mixture of polymers was dissolved in dichloromethane, to prepare a 50 wt. % solution. 1 cc of a 2 wt. % solution of trichloroborazine (product of Alfa Chemical Corporation) which was dissolved in dichloromethane was mixed into this solution at a temperature of −80° C., and the temperature of this mixture was returned to the room temperature level over a period of 1 hour.

Thus, a coating solution containing a mixture of a polymer having the following structure (10), in which main chains of the polymer expressed in the formula (8) were cross-linked with each other by chloroborazine through the side chains of —NHSiMe₃, and a polymer having the following structure (11), in which main chains of the polymer expressed in the formula (9) were cross-linked with each other by chloroborazine through the side chains of —NHSiMe₃, was obtained:

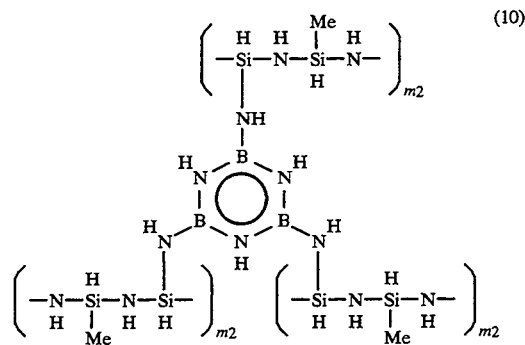

(10)

-continued

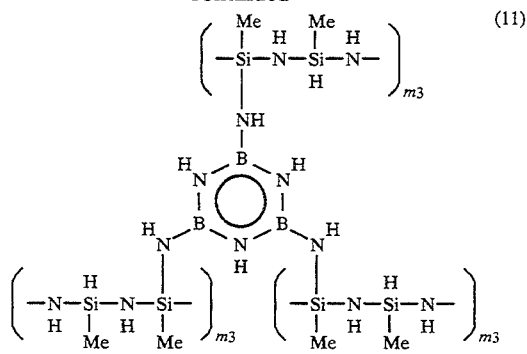
(11)

This polymer mixture coating solution was applied onto the aforementioned base material provided with a chromium oxide layer on its outer surfacer by dipping the base material in the coating solution and lifting the same at a speed of 10 mm/min.

Then, the base material which was thus coated with the coating solution on its outer surface was heated under a nitrogen atmosphere at a temperature of about 300° C. for 50 minutes. The coating and heating steps were carried out three times, to form a coating film of 8 μm in thickness.

Figure 2:
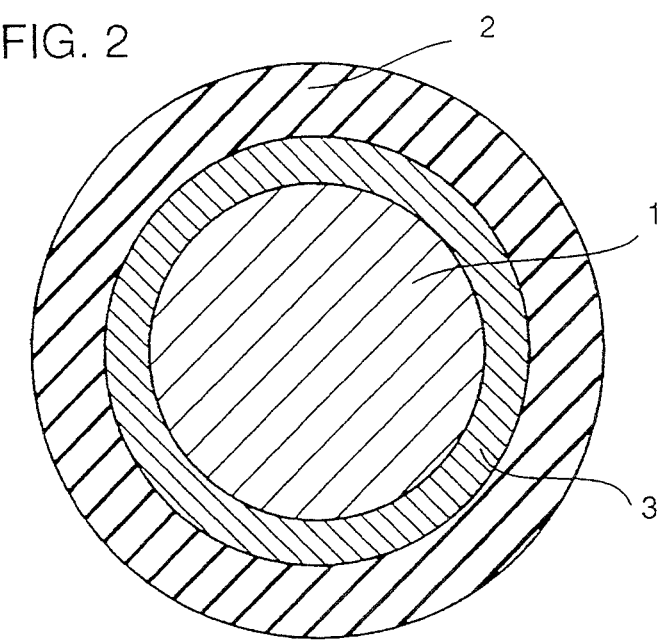
FIG. 2 is a sectional view showing the structure of a heat resistant insulated wire according to Example 2 of the present invention.

FIG. 2 is a sectional view showing the structure of the as-obtained heat resistant insulated wire.

Referring to FIG. 2, this wire comprises a copper wire 1 which is coated with a chromium oxide layer 3 and further coated with an insulating layer 2.

The dielectric breakdown voltage of the heat resistant insulated wire obtained in the aforementioned manner was measured for evaluating insulativity. As the result, the dielectric breakdown voltage was 1500 V under the room temperature. When a sample which was heated at 800° C. for 100 hours was cooled on standing to the room temperature, this sample exhibited a dielectric breakdown voltage of 700 V. When this heat resistant insulated wire was wound on an outer peripheral surface of a cylinder having a diameter of 30 cm, no cracking was caused in the insulating layer.

(EXAMPLE 3)

40 g of 1,1,1,3,3,3-hexamethydisilazane (product of Wako Pure Chemical Industries, Ltd.) which was maintained at a temperature of −80° C. was mixed with 13 g of trichlorosilane having the following structure (12), which was also maintained at a temperature of −80° C., under a nitrogen jet, stirred for 1 hour after the temperature of the mixture was gradually returned to the room temperature, and thereafter the mixture was further stirred at 700° C. for 1 hour. Then, distillation was carried out at 160° C., to distill away by-products. Then, vacuum distillation was carried out at 180° C. and 5 mmHg, whereby it was possible to completely remove the by-products.

(12)

Thus, a polymer having the following structure (13) was obtained.

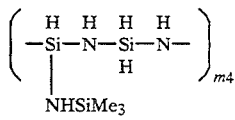
(13)

$m_4 > 0$, where $m_4 > 0$.

This polymer was dissolved in dichloromethane, to prepare a 50 wt. % solution. Then, 1 cc of a 2 wt. % solution of trichoroborazine which was dissolved in dichloromethane was mixed into this solution at a temperature of −80° C., and the temperature of this mixture was returned to the room temperature level over a period of 1 hour.

Thus, a coating solution having the following structure (14), in which main chains of the polymer expressed in the formula (13) were cross-linked with each other by choroborazine through the side chains of —NHSiMe₃, was obtained:

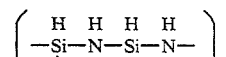
(14)

This polymer coating solution was applied onto a base material provided with a chromium oxide layer on its outer surface, which was similar to that obtained in Example 2, by dipping the base material in the coating solution and lifting the same at a speed of 10 mm/min.

Then, the base material thus coated with the coating solution on its outer surface was heated under a nitrogen atmosphere at a temperature of about 300° C. for 50 minutes. The coating and heating steps were carried out three times, to form a coating film of 8 μm in thickness.

The sectional structure of the as-obtained heat resistant insulated wire was similar to that of Example 2 shown in FIG. 2.

The dielectric breakdown voltage of the heat resistant insulated wire obtained in the aforementioned manner was measured for evaluating insulativity. As the result, the dielectric breakdown voltage was 1600 V under the room temperature. When a sample which was heated at about 800° C. for 100 hours was cooled on standing to the room temperature, this sample exhibited a dielectric breakdown voltage of 500 V. When this heat resistant insulated wire was wound on an outer peripheral surface of a cylinder having a diameter of 30 cm, no cracking was caused in the insulating layer.

As understood from the aforementioned Examples, the chromium oxide layer is formed by an electrochemical process. When the chromium oxide layer is formed by electroplating, a solution which is prepared by adding a small amount of organic acid to an aqueous solution of chromic acid is employed. In general, a sergeant bath which is mainly composed of chromic acid and sulfuric acid is known as an electrolytic bath employed for chromium plating, while the chromium plating in the present invention is different from the general one in the following point:

Mineral acid which is mixed into an electrolytic bath employed for general chromium plating is adapted to dissolve chromium oxide which is formed on a plating surface in electroplating. Therefore, a glossy metal chromium layer is plated. According to the present invention, however, it is necessary to preferentially plate the chromium oxide. In order to further improve wettability and adhesion of the coating film, a layer which is mainly composed of chromium oxide preferably has a velvety coarse surface. Therefore, the chromium plating according to the present invention is different from general glossy plating in conditions such as a treatment current density. While a current density of about 10 to 60 A/dm$^2$ is employed in the glossy plating depending on the treatment temperature, a current density of 100 to 200 A/dm$^2$ is employed in the present invention for forming a chromium oxide layer having a coarse surface.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of preparing a heat resistant insulated wire, comprising:

a step of adding not more than 1 part by weight of chloroborazine to 10 parts by weight of a first polymer containing main chains being expressed in the following chemical formula:

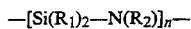

where $n >$ zero and $R_1$ and $R_2$ independently represent hydrogen or hydrocarbon radicals, and side chains being expressed in the following chemical formula:

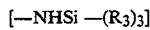

where $R_3$ represents a hydrocarbon radical, for forming a second polymer in which said main chains of said first polymer are cross-linked by said chloroborazine through said side chains;

a step of applying a coating solution containing said second polymer onto a surface of a base material consisting of an electrical conductor; and a step of heat treating said base material being coated with the coating solution at a temperature of at least about 300° C. and not more than 500° C.

2. A method of preparing a heat resistant insulated wire in accordance with claim 1, wherein
said $R_1$ represents a radical being selected from a group of hydrogen, straight and branched chain saturated and unsaturated aliphatic hydrocarbons and aromatic hydrocarbon.

3. A method of preparing a heat resistant insulated wire in accordance with claim 1, wherein
said $R_1$ represents a radical being selected from a group of hydrogen, methyl, ethyl, propyl, butyl and phenyl radicals.

4. A method of preparing a heat resistant insulated wire in accordance with claim 1, wherein
said $R_2$ represents a radical being selected from a group of hydrogen, straight and branched chain saturated and unsaturated aliphatic hydrocarbons and aromatic hydrocarbon.

5. A method of preparing a heat resistant insulated wire in accordance with claim 1, wherein
said $R_2$ represents a radical being selected from a group of hydrogen, methyl, ethyl, propyl, butyl and phenyl radicals.

6. A method of preparing a heat resistant insulated wire in accordance with claim 1, wherein
said $R_3$ represents a methyl or phenyl radical.

7. A method of preparing a heat resistant insulated wire, comprising:

a step of reacting 1, 1, 1, 3, 3, 3-hexamethylsilazane with a compound being expressed as $R_4SiCl_3$ for forming a first polymer having the following structural formula:

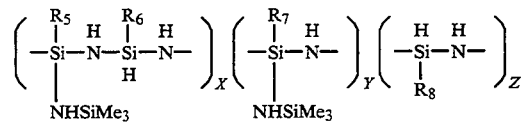

where $X > 0$, $Y \geq 0$ and $Z \geq 0$, and $R_4$, $R_5$, $R_6$, $R_7$ and $R_8$ represent radicals being selected from a group of hydrogen, methyl and phenyl radicals, while $R_5$, $R_6$, $R_7$ and $R_8$ represent hydrogen radicals when $R_4$ represents a hydrogen radical;

a step of adding not more than 1 part by weight of chloroborazine to 10 parts by weight of said first polymer for forming a second polymer having the following structure:

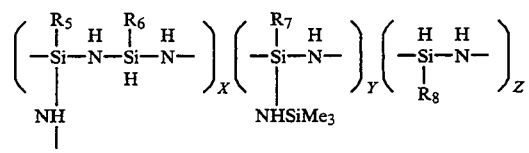

-continued

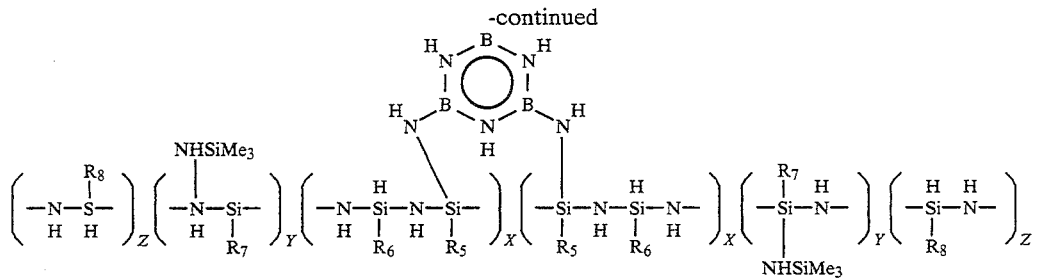

where X, Y, $R_5$, $R_6$, $R_7$ and $R_8$ are identical to the above;

a step of applying a coating solution containing said second polymer onto a surface of a base material consisting of an electrical conductor; and a step of heat treating said base material being coated with said coating solution at a temperature of at least about 300° C. and not more than 500° C.

8. A method of preparing a heat resistant insulated wire in accordance with claim 7, wherein
said $R_4$, $R_6$ and $R_8$ represent phenyl radicals, and
said $R_5$ and $R_7$ represent hydrogen radicals.

9. A method of preparing a heat resistant insulated wire in accordance with claim 7, wherein
said $R_4$, $R_6$ and $R_8$ represent methyl radicals, and
said $R_5$ and $R_7$ represent hydrogen or methyl radicals.

10. A method of preparing a heat resistant insulated wire in accordance with claim 1, wherein said base material includes a chromium oxide layer on said surface of said conductor.

11. A method of preparing a heat resistant insulated wire in accordance with claim 7, wherein said base material includes a chromium oxide layer on said surface of said conductor.

* * * * *

UNITED STATES PATENT AND TRADEMARK OFFICE
CERTIFICATE OF CORRECTION

PATENT NO. : 5,431,954
DATED : July 11, 1995
INVENTOR(S) : Inazawa et al.

It is certified that error appears in the above-indentified patent and that said Letters Patent is hereby corrected as shown below:

Col. 2, line 46, insert paragraph spacing before "n".

Col. 3, in the structural formula at about line 15, in the first bracketed unit, replace "S" (as in original text) by --Si--.

Col. 5, in the structural formula at about line 40, in the first bracketed unit, replace "S" (as in original text) by --Si--.

Col. 6, line 13, after "had" insert --a--.

Col. 8, line 22, replace "n$_2$and" by --n$_2$ and--;
line 29, after "0," insert --and--, after "n$_3$," insert --and--.

Col. 10, line 13, replace "trichoroborazine" by --trichloroborazine--;
line 21, replace "choroborazine" by --chloroborazine--.

Col. 13, in the structural formula at about line 10, in the first bracketed unit, replace "S"(as in original text) by --Si--.

Signed and Sealed this

Twenty-third Day of January, 1996

Attest:

BRUCE LEHMAN

*Attesting Officer*     Commissioner of Patents and Trademarks